United States Patent
Wieczorek et al.

(10) Patent No.: US 12,345,388 B2
(45) Date of Patent: Jul. 1, 2025

(54) FUNCTIONAL MEANS FOR IMAGING DEVICE, LIGHTING MODULE, REAR VIEW DEVICES, DRIVING ASSISTANCE SYSTEM AND VEHICLE

(71) Applicant: Motherson Innovations Company Limited, London (GB)

(72) Inventors: Romeo Wieczorek, Stuttgart (DE); Kolluharsha Vardhanrao, Bangalore (IN)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/008,999

(22) PCT Filed: Jun. 14, 2021

(86) PCT No.: PCT/EP2021/065913
§ 371 (c)(1),
(2) Date: Dec. 8, 2022

(87) PCT Pub. No.: WO2021/250272
PCT Pub. Date: Dec. 16, 2021

(65) Prior Publication Data
US 2024/0384855 A1    Nov. 21, 2024

(30) Foreign Application Priority Data
Jun. 12, 2020   (DE) .................. 10 2020 115 637.5

(51) Int. Cl.
*F21S 45/60*   (2018.01)
*B60Q 1/00*   (2006.01)
(Continued)

(52) U.S. Cl.
CPC ............ *F21S 45/60* (2018.01); *B60Q 1/0023* (2013.01); *B60Q 1/247* (2022.05); *F21S 41/13* (2018.01);
(Continued)

(58) Field of Classification Search
CPC .. F21S 45/60; F21S 41/24; F21S 41/13; F21S 41/141; F21S 41/285; B60Q 1/247; B60Q 1/0023
See application file for complete search history.

(56) References Cited

U.S. PATENT DOCUMENTS

2019/0184940 A1\* 6/2019 Moon ..................... H05B 3/16
2022/0128217 A1\* 4/2022 Kuttikkattil ........... G01S 13/931
(Continued)

FOREIGN PATENT DOCUMENTS

CN         108980771 A       12/2018
DE    10 2010 013559 A1    10/2011
(Continued)

OTHER PUBLICATIONS

International Search Report and Written Opinion dated Aug. 27, 2021 of International application No. PCT/EP2021/065913.

*Primary Examiner* — Christopher E Dunay
(74) *Attorney, Agent, or Firm* — Jones Day

(57) ABSTRACT

The invention refers to an imaging device and/or lighting module comprising at least one camera and/or at least one lamp means, a cover element, a filter element and at least one lighting element, wherein the lighting element emits light in the range of the infrared spectral range, wherein the filter element is connected to the cover element or is part of the cover element, wherein at least a part of the energy of the emitted light is at least partially absorbed by the filter element and is converted into heat for heating the filter element and thus the cover element, wherein the lighting
(Continued)

element is arranged at a distance from the filter element of at most 10 mm, preferably 5 mm, most preferably 2 mm, or the lighting element is in direct contact with the filter element to convert the energy of the emitted light into heat as efficiently as possible.

It also refers to a rear view device, a driving assistance system and a vehicle with such an imaging device.

24 Claims, 11 Drawing Sheets

(51) Int. Cl.
| | |
|---|---|
| *B60Q 1/24* | (2006.01) |
| *F21S 41/13* | (2018.01) |
| *F21S 41/141* | (2018.01) |
| *F21S 41/20* | (2018.01) |
| *F21S 41/24* | (2018.01) |
| *H04N 23/52* | (2023.01) |
| *H04N 23/56* | (2023.01) |
| *H04N 23/57* | (2023.01) |

(52) U.S. Cl.
CPC ............ *F21S 41/141* (2018.01); *F21S 41/24* (2018.01); *F21S 41/285* (2018.01); *H04N 23/52* (2023.01); *H04N 23/56* (2023.01); *H04N 23/57* (2023.01)

(56) References Cited

U.S. PATENT DOCUMENTS

| | | | |
|---|---|---|---|
| 2022/0260230 A1* | 8/2022 | Groene | F21S 41/28 |
| 2022/0400534 A1* | 12/2022 | Kanechika | H05B 3/141 |
| 2023/0264656 A1* | 8/2023 | Chaudhari | B60Q 1/0005 |
| | | | 219/202 |
| 2024/0324073 A1* | 9/2024 | Chen | F21S 45/60 |

FOREIGN PATENT DOCUMENTS

| | | | | |
|---|---|---|---|---|
| DE | 10 2014 110841 A1 | 2/2016 | | |
| DE | 102017131441 A1 * | 7/2018 | ............. | F21S 41/28 |
| JP | 2006 303867 A | 11/2006 | | |

* cited by examiner

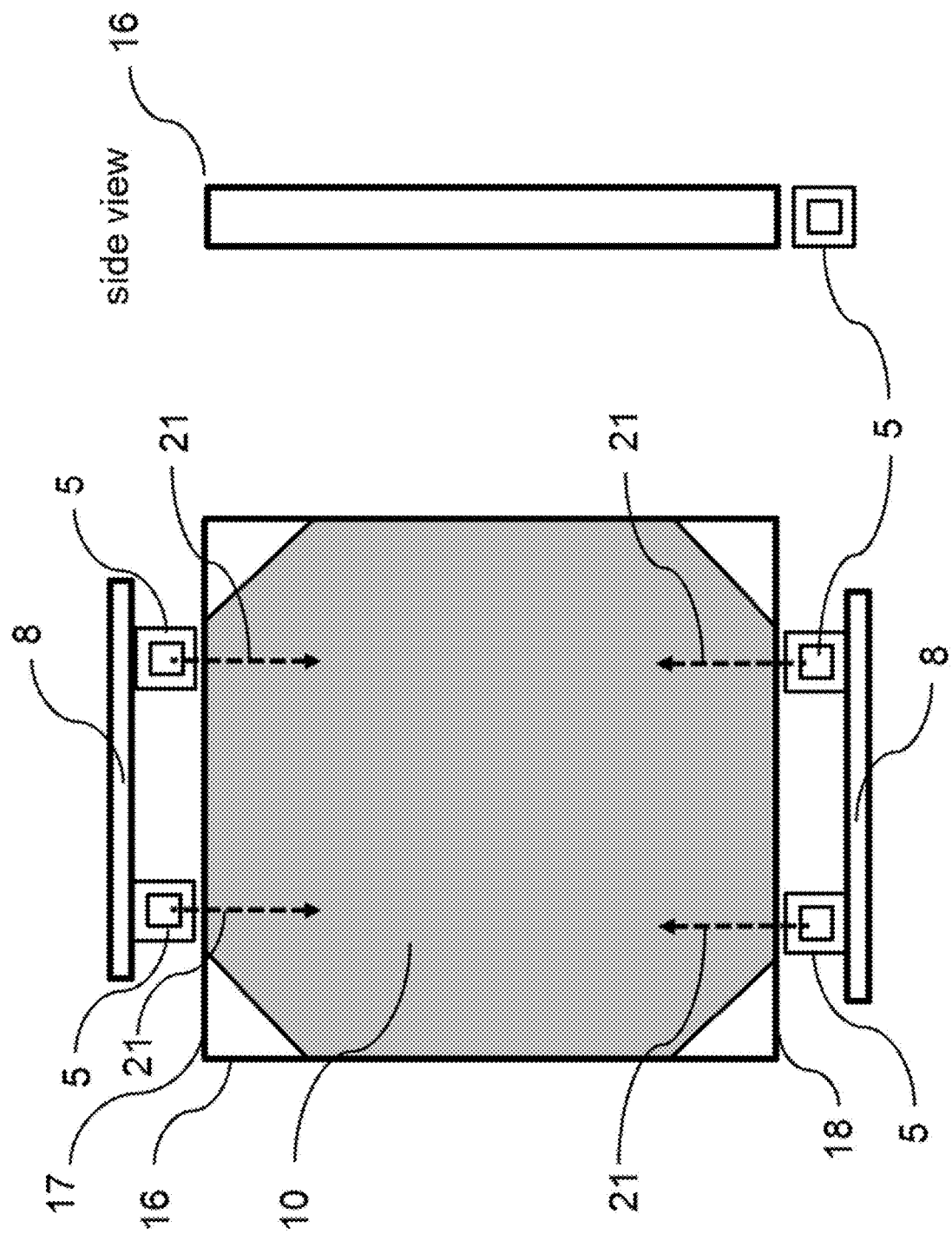

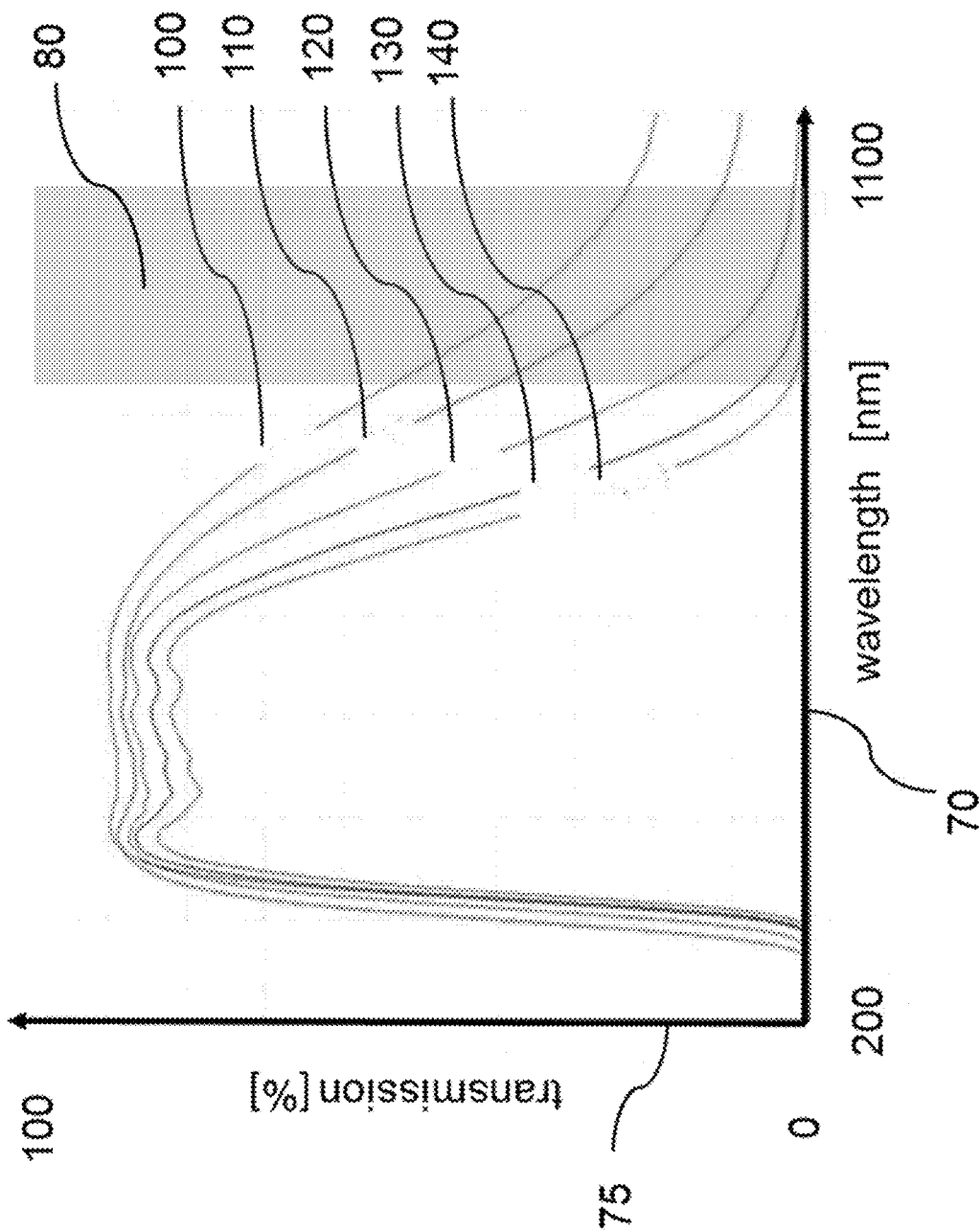

FUNCTIONAL MEANS FOR IMAGING DEVICE, LIGHTING MODULE, REAR VIEW DEVICES, DRIVING ASSISTANCE SYSTEM AND VEHICLE

CROSS-REFERENCE TO RELATED APPLICATIONS

This application is a National Stage Entry of International Patent Application No. PCT/EP2021/065913, filed on Jun. 14, 2021, which claims the benefit of priority to German Patent Application No. DE 10 2020 115 637.5, filed on Jun. 12, 2020, each of which is hereby incorporated by reference in its entirety for all purposes.

BACKGROUND

1. Field

The present invention refers to a functional means for imaging devices and/or lighting modules each with at least one of a camera and a lamp means and a cover element through which a camera can obtain images and/or the light of the lamp means is transmitted, and rear view devices, driving assistance systems and vehicle with such imaging devices and/or lighting modules, with a special heating element.

2. Related Art

Current imaging devices or lighting modules used in the outdoor area, in general, require a cover element, as for example a cover glass, in order to protect a camera and/or a lamp means and optics from environmental damages. A common problem of such cover glasses is that they are iced or fogged up, when exposed to low temperatures and/or high humidity.

Conventional heating techniques for defrosting the cover element employ resistance wires or ITO- (indium tin oxide) coatings. While the first alternative has the problem that it defrosts the cover glasses radially from the outside to the center such that the central field of vision of an imaging device becomes operable with a time delay; the second alternative is expensive and complex to implement with regard to the contacting.

Also, it is known in the prior art that absorbed light produces heat due to radiationless deexcitation of excited energy states, with the excited energy states being generated by the absorption of light of wavelengths matching the respective energy difference between two energy states in a material. In order to heat a material by irradiation, light of wavelengths matching the absorption spectrum of the material is required. Heating elements based on this concept are used for example to heat up lenses and/or mirrors of surveillance cameras or different lighting devices in motor vehicles.

For example, the German Patent DE 10 2011 080 489 B4 discloses a motor vehicle headlamp comprising a housing with a light exit opening closed by a cover pane and at least one lighting module arranged in the housing for generating a predetermined light distribution in front of the vehicle, wherein the lighting module has at least one light source for emitting the light for the light distribution, wherein on or into the cover glass infrared radiation absorbing means are applied or introduced which are transparent to light in a wavelength range visible to the human eye, characterized in that the infrared radiation absorbing means are designed in such a way that they reflect at least part of the infrared radiation falling on the cover pane from outside the housing.

Another example is given in the Chinese patent application CN 1089542, where a lamp with heating, ice melting and snow and fog removing functions is disclosed. The lamp comprises a long strip lamp and a transparent heating film. In the working process, bulbs with the same number as sleeves are installed on a lamp base, the transparent heating film and a long strip lamp PC panel are glued through glue, the transparent heating film and the long strip lamp PC panel, which are connected are placed on the side face of the long strip lamp, the transparent heating film is placed on the inner side face, two symmetrically-arranged long strip lamp pressing strips press the long strip lamp, multiple sets of first internal hexagonal bolts correspond to first thread holes, the long strip lamp pressing strips are fixed through screwing, fog and snow on the outer surface of the long strip lamp PC panel are molten into water drops to flow away, and further drying is achieved for flowing away water drops. By means of the lamp, the uniform heating efficiency can be provided for a driving vehicle lamp, the whole lamp is heated evenly, fog or snow on the vehicle lamp can be completely removed, a light source is protected, a good illuminating range is provided, and a safety guarantee is provided for a vehicle driving at night.

SUMMARY

It is the object of the present invention to provide a function means for an imaging device and/or a lighting module with at least one of a camera and a lamp means and a cover element through which the camera can obtain images and/or or the light of the lamp means is transmitted, which is overcoming the drawbacks of the prior art. In particular, an functional means of the invention is to comprise a heating element, which at the same time is inexpensive, allows a simple manufacturing and an effective heating of a cover element of the imaging device to reduce the time until the imaging device is fully operable, i.e. when the cover glass is iced, fogged up or the like.

This object is solved by an imaging device and/or illumination module comprising at least one camera and/or at least one lamp means, a cover element, a filter element and at least one lighting element, wherein the lighting element emits light in the range of the infrared spectral range, wherein the filter element is connected to the cover element or is part of the cover element, wherein at least a part of the energy of the emitted light is at least partially absorbed by the filter element and is converted into heat for heating the filter element and thus the cover element, wherein the lighting element is arranged at a distance from the filter element of at most 10 mm, preferably 5 mm, most preferably 2 mm, or the lighting element is in direct contact with the filter element to convert the energy of the emitted light into heat as efficiently as possible.

An advantage of the imaging device or the lighting module is that the distance between the infrared lighting element relative to the filter element is very small or the illumination element is in contact with the filter element, so that the energy of the emitted light can be converted directly into heat inside the filter element and thus to heat the cover element, for example, to effectively remove ice or condensation water.

Advantageously, the at least one lighting element is arranged laterally in relation to the filter element, so that a beam direction of the lighting element relative to a imaging direction of the imaging device and/or to an lighting direction of the lighting module has an angle between 40° and 130°, preferably 70° to 110°.

Advantageously, the filter element has a rectangular shape, wherein the at least one lighting element is arranged laterally on an edge of the rectangular filter element.

Advantageously, at least one first lighting element is arranged laterally on an edge of the rectangular filter element, wherein a second lighting element is arranged laterally on an opposite edge of the rectangular lighting element.

Advantageously, the filter element has a rectangular shape with beveled corners, wherein the at least one lighting element is arranged laterally at one of the beveled corners of the filter element.

Advantageously, a lighting element is arranged laterally at all four beveled corners.

Advantageously, the at least one filtering element is directly connected to the cover element in front of the camera and/or the lamp means and converts at least part of the energy of light impinging thereon, with wavelengths falling within the cut off wavelength range of the filtering element, into heat for heating up the cover element, with the cut off wavelengths preferably being in the infrared (IR) spectral range.

The filtering element can be comprised by a heating and filtering element, and/or one or more absorbing layers on the cover element, and/or a one-part heating, filtering and cover element formed together with the cover element.

With the invention it is proposed that the cover element and/or the filtering element is manufactured from glass, preferably IR cut off filter glass and/or Plexiglas material (PMMA), and/or the one-part heating, filtering and cover element is provided by tinted glass, with in particular a tinting of around 15%.

The cover element or the one-part heating, filtering and cover element preferably is separate from a lens and/or mirror of the camera and/or lamp means.

It is preferred that the cut-off wavelength range of the filtering element is matched to the cut-off wavelength range required by the camera, and/or lies within the wavelength range of sun light and/or lies within the wavelength range of at least one lighting element comprised by the imaging device and/or lighting module and emitting light onto the filtering element and/or is at least partially transparent to the light emitted by the lamp means, wherein the lamp means preferably emits light in the visible range.

Further, it is proposed with the invention that the filtering element is arranged substantially perpendicular to the optical axis of the camera and/or the lamp means and/or within the central field of view of the camera and/or within the beam cone of the lamp means, and/or a first absorbing layer is provided on the side of the cover element facing towards the camera, and/or a second absorbing layer is provided on the side of the cover element facing away from the camera.

Still further, preferred embodiments of the invention are characterized in that a first self-cleaning coating is provided on the side of the cover element facing towards the camera and/or lamp means, and/or a second self-cleaning coating is provided on the side of the cover element facing away from the camera and/or lamp means, each self-cleaning layer preferably comprises a waxing layer or hydrophobic or a super hydrophobic coating.

Embodiments of the invention can be characterized in that two or more lighting elements are used, with preferably one or more first lighting element emits light with wavelengths in a first range to be cut-off by the first absorbing layer, one or more second lighting element emits light with wavelengths in a second range to be cut-off by the second absorbing layer and/or to at least partially pass the first absorbing layer.

At least one reflecting element, preferably comprising a reflecting layer, and/or at least one optical element, preferably comprising focusing optics, and/or at least one light guide with preferably light coupling-out points that are preferably equidistantly distributed, and/or at least one mounting element for the lighting element(s) for adjusting the relative arrangement between the lighting element(s) and the heating element adapted to direct light emitted by the lighting element(s) to at least one area of the cover element to be heated, which preferably is aligned with the optical axis and/or the central field of view of the camera and/or the beam cone of the lamp means.

Embodiments of the invention can be characterized that the light guide provides light at least one light coupling-in element on at least one end of the light guide and/or another end of the light guide and/or on opposite ends of the light guide, for at least coupling-in light emitted by the lighting elements and/or the lamp means.

In another embodiment of the imaging device and/or lighting module the light guide is provided as one-part cover and light guiding element, with preferably comprising light coupling-out points and/or optical elements.

Further, in other embodiments of the imaging device and/or lighting module the light of the lamp means and/or the lighting elements are coupled in the light guide, preferably by a dual light coupling-in element, on the same end and/or on opposite ends and/or on all ends of the light guide, wherein preferably a plurality of lighting elements and/or lamp means are used.

With the invention it is proposed that there are at least two lighting elements emitting light overlapping on the cover element and/or in an overlapping area, which preferably is matched to the at least one area of the cover element to be heated, which preferably is aligned with the optical axis and/or the central field of view of the camera and/or the beam cone of the lamp means.

The lighting element(s) can directly or indirectly illuminate the heating element(s), in particular by passing a region of the cover element and/or being reflected by the reflecting element and/or via total internal reflection.

Preferred embodiments of the invention are further characterized by a housing, which preferably is closed by the cover glass or the one-part heating, filtering and cover element, and/or ventilation means, which is provided by at least one opening or gap, in particular comprising a gap between the cover glass or the one-part heating, filtering and cover element and the housing, or a sealed interior, which has a negative pressure, in particular a vacuum, and/or is filled with dry air or protective gas, with said sealed interior comprising the ambient space between the camera the lighting element(s) and the cover glass or the one-part heating, filtering and cover element.

According to the invention it is preferred that the lighting element(s) are attached to or integrated in the cover element and/or the filter element, preferably at sides of the cover element and/or the filter element having an angle to the optical axis of the camera from 0° to 70°, preferably 5° to 45°, and/or at regions without a heating element.

In a further embodiment the imaging device and/or lighting module is characterized in that one or more lighting elements, preferably integrated on at least one, preferably two, printed circuit boards, are used, wherein the lighting elements are arranged on side planes of the filtering element, which are substantially parallel to the optical axis of the imaging device and/or lighting module, and the top surfaces of the lighting elements projecting the light into the filtering element, wherein preferably, if more than one lighting elements is used, the lighting elements are arranged on opposite side planes.

In another embodiment of the invention the imaging device and/or lighting module is characterized in that the one or more lighting elements are attached to and/or placed on the filtering element side planes and/or beveled corners of the filtering element, wherein the beveled corners form new side planes, which are preferably angled by 45 degrees, and on which the lighting elements (5) is placed on/attached to.

It is further preferred for an imaging device and/or lighting module according to the invention at least in case of the two before mentioned embodiments that the thickness and/or the width the side planes of filtering element is equal to or greater than outer boundary of each lighting element and/or additionally printed circuit boards are arranged around to and/or in thermal contact with the filtering element side planes, wherein the additional printed circuit boards comprise components, preferably on the surface facing the filtering element, which generate heat that complements to the process of heating of the filtering element.

Embodiments of the invention can be characterized by a control unit and/or an interface to an external control unit, being connected to the lighting element(s) and/or the camera and/or the mounting element(s) and/or at least one sensor element, especially a temperature sensor, preferably controlling the lighting element(s) depending on whether the camera and/or lamp means is switched on and/or a signal received from the at least one sensor element and/or via the interface and/or a signal received from the camera and/or lamp means and/or a user input, wherein data communication with the control unit (3) is preferably provided by I2C, SPI, CAN, LIN or by voltage/current signals Said controlling the lighting element(s) can comprise switching on, switching off, changing the amplitude, frequency, pulsing, pulsing sequence and/or propagation direction of the light emitted by the lighting element(s).

The invention also provides a rear view device for a vehicle, a driving assistance system for a vehicle as well as a vehicle with at least one imaging device and/or lighting module. The control unit can be connected to the vehicle control unit and/or the external control unit is comprised by the vehicle control unit.

The above listed embodiments can be used individually or in any combination to provide the device and the process in accordance with the invention.

BRIEF DESCRIPTION OF THE DRAWINGS

The invention may be best understood with reference to the following description of embodiments taken together with the accompanying drawings:

FIG. 9 is a top view and side view of a heating and filtering element, where the lighting elements are integrated on printed circuit boards and are placed on opposite side planes of the heating and filtering element.

FIG. 11 gives reference transmission spectra of cut off filters, which are suited as heating element according to the invention.

DETAILED DESCRIPTION

Figure 1A:
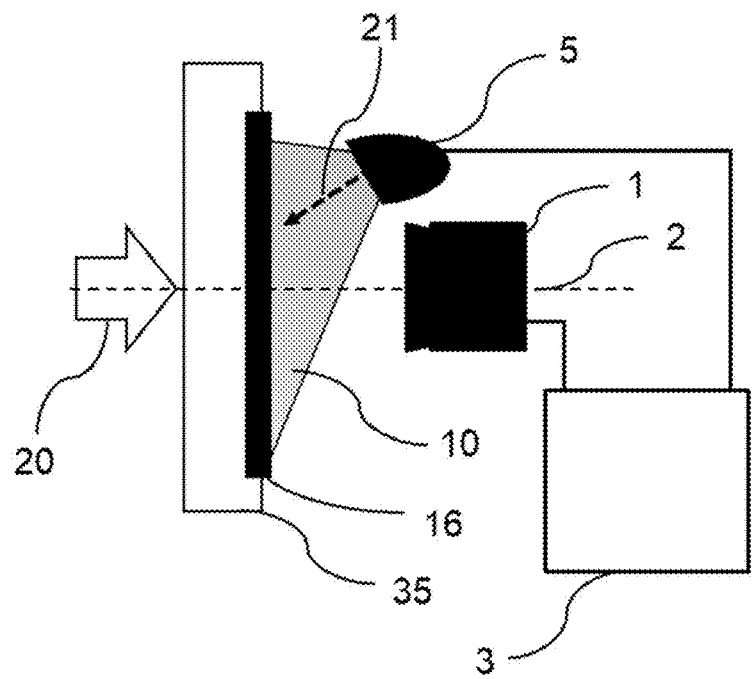
FIG. 1a is a schematic demonstration of a first imaging devices according to the invention with one lighting element, a control unit, a heating and a filtering element connected to a cover element.
Figure 1B:
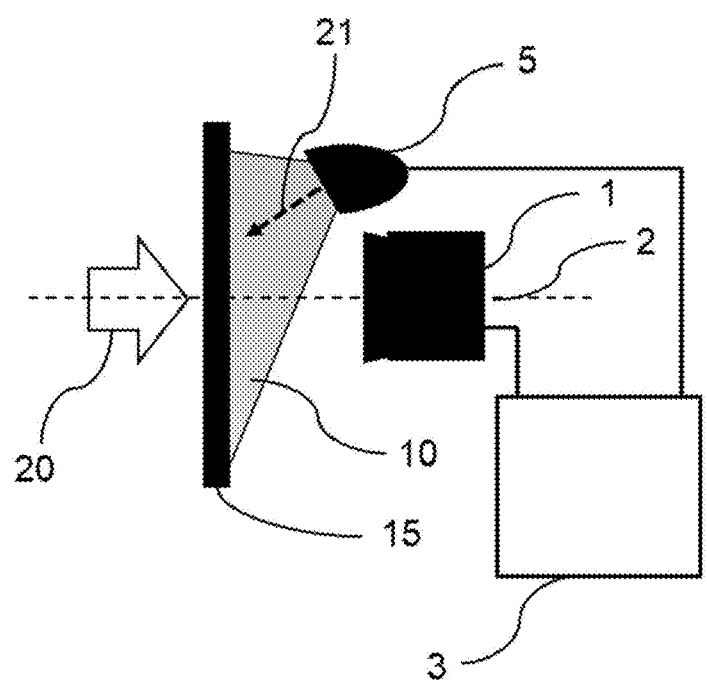
FIG. 1b is a schematic demonstration of a second imaging device according to the invention with one lighting element, a control unit and a one-part heating, filtering and cover element.

FIGS. 1a and 1b each show one embodiment of an imaging device according to the invention with a camera 1 and a lighting element 5. According to FIG. 1a the lighting element 5 emits light 10 in a wavelength that is absorbed by a heating and filtering element 16, which is directly connected to a cover element 35 in front of the camera 1, for example by clipping, gluing or a threaded joint, wherein the cover element 35 serves as protection of the camera 1. Both, heating and filtering element 16 and cover element 35 are at least transparent in the desired spectral range for imaging. According to FIG. 1b the emitted light 10 is absorbed by a one-part heating filtering and cover element 15 located in front of the camera 1. In both cases a heating elements comprises at least one area absorbing light in order to produce heat as a result of the thermal relaxation of the absorbed light.

Referring to FIG. 1a, the heating and filtering element 16 is used to absorb the light of the lighting element 5 in order to provide heat to heat up the connected cover element 35 and to act as spectral filter for the radiation from outside 20 in order to obtain images by the camera 1 only in the desired spectral range.

In this configuration also a passive heating can be achieved due to the absorption of the outside radiation 20, since the radiation from outside, such as sun light, normally comprises at least partially light of the wavelength or spectral range absorbed by the heating element 16.

Preferably, the ambient space between the camera 1, the lighting element 5 and the complex formed by the filtering and heating element 16 and the cover element 35 is free from humidity or the like to prevent any formation of liquid droplets on the inside of the filtering and heating element 16 or the cover element 35 during the heating. For example, the ambient space can be evacuated or filled with dry air or another suitable protective gas. The ambient space can be defined by a not shown housing, which is closed by the cover element 35, in particular in an airtight manner.

Each of the lighting elements 5 has a lighting direction 21, as shown by the dashed arrows. The lighting direction 21 may correspond to an averaged direction of the fan beam of the emitted light 10 of the lighting element 5.

In FIG. 1b the heating element is provided as a one-part heating, filtering and cover element 15, comprising the properties of both the heating and filtering element 16 and the cover element 35 of the first embodiment shown in FIG. 1a. Thus, a more effective solution is provided, since the heat generated by absorption is directly produced within the same element serving as cover element and avoids ineffective heat transfer via thermal diffusion processes. Such an one-part heating, filtering and cover element 15 can be formed from a tinted glass of a thickness of e.g. 3 mm.

By providing the cover element 35 or the one-part heating, filtering and cover element 15 separate from the camera 1, i.e. in addition thereto, any camera 1 can be upgraded easily by being installed in an imaging device of the invention. Still further, this separation of e.g. a lens of the camera 1 on the one hand and the cover element 35 or the one-part heating, filtering and cover element 15 on the other hand provides design freedom, in particular with respect to the arrangement of the lighting element 5.

Also shown in FIGS. 1a and 1b is a control unit 3, which is connected between the camera 1 and the lighting element 5. Image data can be transferred from the camera 1 to the control unit 3 to determine if the cover element of the camera 1, provided by the cover element 35 or the heating, filtering and cover element 15, is iced, fogged up, or covered with condensed water preventing a clear view of the camera 1 through the cover element. Depending on such a determination the control unit 3 then can activate the lighting element 5 for heating up the cover element either via the heating and filtering element 16 or the one-part heating, filtering and cover element 15.

The control unit 3 is arranged to control the lighting element 5 in order enable the lighting element 5 to provide a pulsing sequence for the illumination of the heating and filtering element 16. This pulsing sequence can control the thermal diffusion of heat to the ambient space from the heating and filtering element 16 and the cover element 35, by adjusting the respective thermal diffusion length with the frequency with which the lighting element 5 emits light.

Further the cover element 35 and/or the heating and filtering element 16 or the one-part heating, filtering and cover element 15, can comprise a self-cleaning coating, such as a waxing layer or a super hydrophobic coating in front of the camera 1. These self-cleaning-coatings provide an effective removing of liquid droplets, which can be formed during the defrosting process, from the cover element 35 and/or the heating and filtering element 16 or the one-part heating and filtering cover element 15. Alternatively, the imaging device can comprise a ventilation in order to avoid the formation of liquid droplets on the surfaces facing to the camera 1 by avoiding trapped air. The ventilation allows an escape and can be provided by openings in a housing of the imaging device of the invention. But also providing more space inside the imaging device reduces the formation of droplets due to condensation as heat can dissipate. Such a dissipation, in addition, accelerates the heating up of the cover element 35 and/or the heating and filtering element 16 or the one-part heating, filtering and cover element 15.

Waxing e.g the cover element 35 and allowing some ventilation for the hot air formed inside the imaging device reduces the amount of water droplets formed on the surfaces of the cover element 35. Further, providing enough space for the lighting element 5 to dissipate heat formed by the same will save the imaging device from burning and getting damaged. Tests done with a lighting element 5 in form of a LED (light emitting diode) with 6 V have proven to be safer for the imaging device than tests done with 10 V as heating resulting from the printed circuit board (PCB) of the LED is less with 6 V than 10 V.

The cover element 35 can be made out of glass having a thickness of at least 2 mm, with 3 mm being preferred. Such a glass can be tinted, for example 15%, to provide a one-part heating, filtering and cover element 15.

While FIGS. 2 to 10 describe alternative imaging device according to the invention, which will be describes in detail below, FIG. 11 gives an overview over possible cut off filters 100, 110, 120, 130, 140, which absorb near infrared light and are suited to be comprised by the heating and filtering element 16 in the embodiment of FIG. 1a or the heating, filtering and cover element 15 in the embodiment of FIG. 1b for obtaining images via the camera 1.

The shown transmission spectra provide information of the transmission in [%] 75 for each wavelength in [nm] 70 in the range of visible and near infrared light. While it is desirable that there is a high transmission 75 of light in the visible spectral range (400 nm to 700 nm), a strong absorption in the near infrared region (780 nm to 1400 nm) 80. An absorption in the mid infrared or far infrared region is not shown, but less preferred.

The filter glasses 140 have been most efficient in generating more heat compared with other filters 100, 110, 120, 130, shown in FIG. 9, as the cut off region starts from 700 nm so hence a lower wavelength emitting IR LED has to be used with the other filters 100, 110, 120, 130. Lesser the wavelength of the electromagnetic radiation higher the energy of the wavelength.

Infrared light also referred to as heat radiation offers the advantage of no or at least weak competition effects, like fluorescence preventing that the absorbed light is transformed to heat after radiationless relaxation of the vibrational modes excited in the material of a filter element or an absorbing layer.

Other spectral ranges, like ultraviolet light, can be absorbed in alternative filters to result in a heating up and, thus, to avoid that the cover element is iced, fogged up, or covered with condensed water when obtaining images with the camera.

As lighting element, devices such as lasers or LEDs (light emitting diodes) or other lighting means that emit light with wavelengths absorbed by the used filters are suited. For example, if a near IR cut off filter is used, LEDs or lasers emitting light with wavelengths of around 900 nm can be utilized. With the additional advantage, that IR light with wavelengths greater than 900 nm is completely invisibility of the IR light to the human eye.

Using a filtering element cutting off with wavelengths between 700 and 750 nm, provided either by the heating, filtering and cover element 15 or the heating and filtering element 16, even renders the common usage of an IR cut off filter for the camera 1 unnecessary. This can lead to further cost reductions.

Sun light has a very broad spectrum, covering the IR range. Thus, sun light will be absorbed by an IR filtering element as used with the imaging device according to the invention such that a passive heating of the cover glass, provided either by the cover element 35 or the heating, filtering and cover element 15, will occur, which reduces or rather delay the tendency of the cover glass to get iced or fogged up when exposed to low temperatures and/or high humidity.

Figure 2:
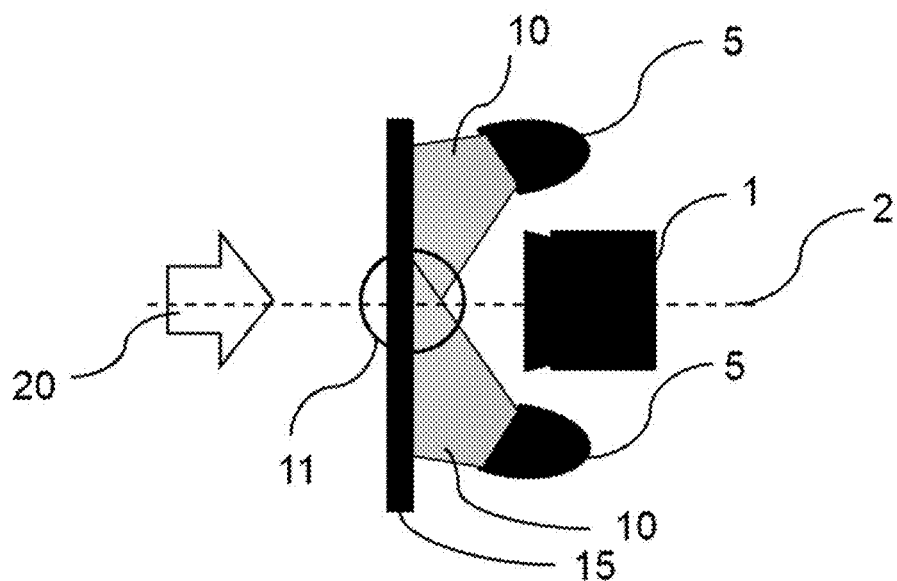
FIG. 2 is a schematic demonstration of a third imaging device according to the invention with a one-part heating, filtering and cover element and two lighting elements.

Turning now to the alternative embodiments of the imaging device according to the invention:

FIG. 2 shows a third embodiment making usage of two lighting elements 5 instead of one as discussed with respect to FIG. 1b. Therefore, the lighting elements 5 can illuminate different areas, with a partially overlapping area 11, or completely overlapping areas. This allows a higher flexibility regarding the illumination pattern, and the corresponding desired heat distribution. Instead of heating, filtering and cover element 15, the heating and filter element 16 and cover element 35 of FIG. 1a can be used with two lighting elements 5.

In FIG. 2, there is one-partially overlapping area 11 corresponding to the central area of the heating, filtering and cover element 15, ensuring a strong heating in this area where the central field of vision of the camera 1 is located. Thus in this embodiment it is provided that the most important area of the field of view is cleared or defrosted at first.

Figure 3:
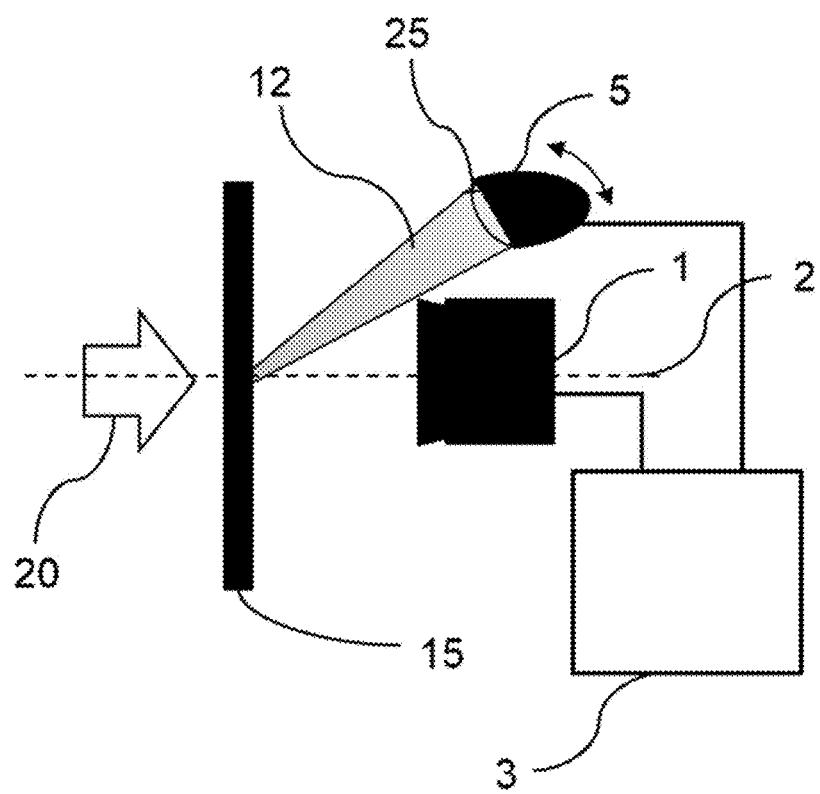
FIG. 3 is a schematic demonstration of a fourth imaging device according to the invention with a one-part heating, filtering and cover element, a control unit and a lighting element with focusing optic.

FIG. 3 shows a fourth embodiment of the imaging device of the invention with one lighting element 5 provided with a focusing optic 25 allowing to focus the light emitted by the lighting element 5 onto the heating element, provided either by the heating filtering and cover element 15 as shown or by the heating and filter element 16 cooperating with the cover element 35.

By focusing the light 12, a higher intensity and thus a stronger heating of a desired area is achieved. Preferably, this area corresponds to the projection of the central field of vision of the camera 1 on the heating element.

Further, the fourth embodiment could be combined with the third embodiment shown in FIG. 2 in order to provide further advantageous illumination and intensity distributions onto the absorbing area.

Still further, the control unit 3 in FIG. 3 can be connected to a controllable mounting element (not shown) pointing to the focus of the lighting element 5 on the area to be heated.

Figure 4:
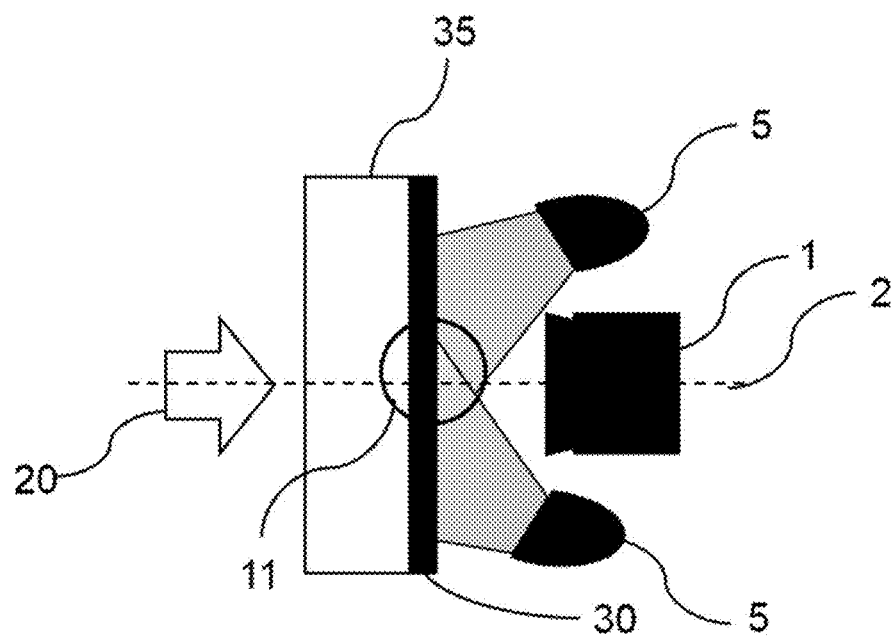
FIG. 4 is a schematic demonstration of a fifth imaging device according to the invention with a cover element with an absorbing layer as heating element and two lighting elements.

FIG. 4 shows a fifth embodiment of an imaging device of the invention differing from the embodiment of FIG. 2 by making usage of a cover element 35 comprising an absorbing layer 30 as heating element on at least one surface, where the absorbing layer could be implemented as coating for example The absorbing area is preferably located on the surface of the cover element 35 facing the camera 1 in order to provide a heating from the inside of the imaging device. This avoids problems based on heat expansion, which could destroy the sealing of the imaging device.

The absorbing layer 30 can, for example, cover only the field of view of the camera 1 and not the complete cover element 35. This heating up from the inside of the imaging device is only feasible due to the fact that the cover element 35 is a separate element from the camera 1.

The embodiment of FIG. 4 can be altered by making usage of two lighting elements 5, a focusing optic 25 and/or a mount.

Figure 5:
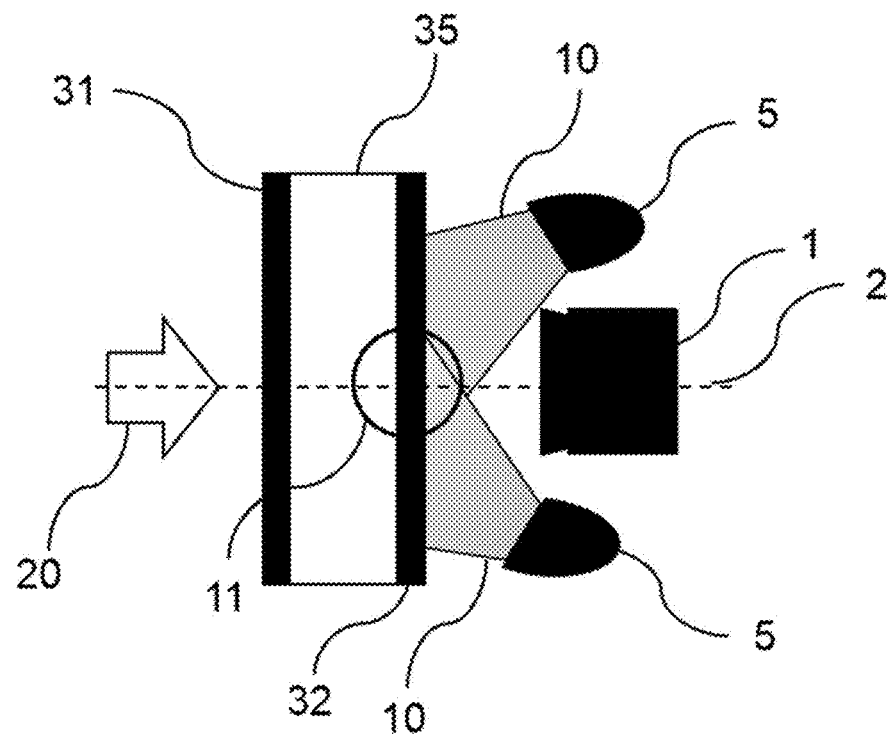
FIG. 5 is a schematic demonstration of a sixth imaging device according to the invention with a cover element with two absorbing layers as heating elements and two lighting elements.

FIG. 5 shows a sixth embodiment making usage of two absorbing layers 31, 32 such that it differs from the embodiment of FIG. 4 by making usage of an additional absorbing layer 31 on the surface of the cover element 35 facing to the outside of the imaging device. This additional layer 31 allows decoupling the passive heating provided by the radiation from outside 20, which comprises at least partially wavelengths that are absorbed by the absorbing layer 31, such as sun light.

Figure 6A:
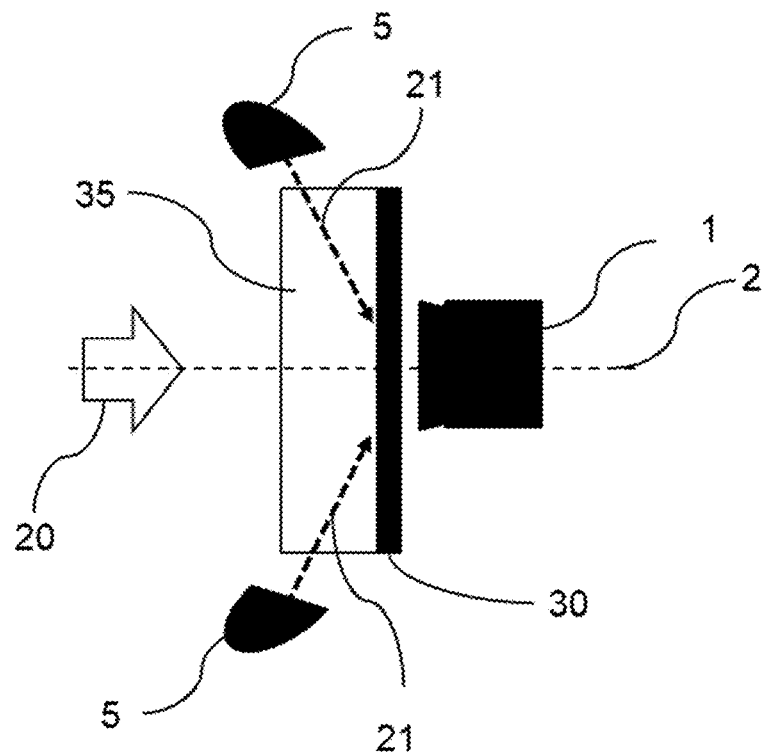
FIG. 6a is a schematic demonstration of a seventh imaging device according to the invention with a cover element with one absorbing layer as heating elements and two lighting elements illuminating the absorbing layer from the side plane of the cover element.
Figure 6B:
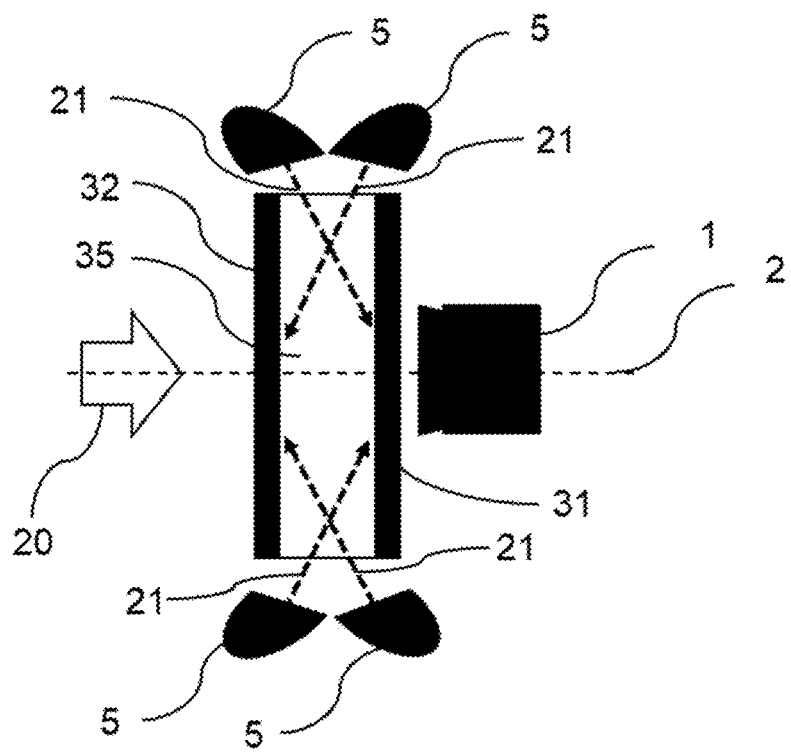
FIG. 6b is a schematic demonstration of a eighth imaging device according to the invention with a cover element with two absorbing layers as heating elements and four lighting elements illuminating the two absorbing layers from the side plane of the cover element.

FIGS. 6a and 6b show two further imaging devices according to the invention based on the embodiments of FIGS. 4 and 5, respectively, but the lighting elements 5 being placed differently. According to FIG. 6a, two lighting elements 5 directly illuminate the absorbing layer 30 by passing a region of the cover element 35; and according to FIG. 6b two lighting elements 5 directly illuminate the absorbing layer 31 and two additional lighting elements 5 directly illuminate the absorbing layer 32, in both cases by passing a region of the cover element 3. Theses embodiments allow for a more compact design of the imagining device and arranging the lighting elements 5 closer to the absorbing layer(s) 30, 31, 32. This increases the available light intensity on the absorbing layer(s) 30, 31, 32.

Further, the embodiment shown in FIG. 6b enables a more controlled and more uniform heating of both surfaces of the cover element 35, combined with the advantage of heating from the inside as described with respect to FIG. 4. The special arrangement of the four heating elements 5 of the eighth embodiment of the invention as shown in FIG. 6b can be easily realized due to the fact that the cover element 35 with its absorbing layers 31, 32 is not provided as part of the camera 1.

Although not shown in FIGS. 6a and 6b, the lighting elements 5 also can be directly attached to or guided, via optical fibers or the like, to the sides of the cover element 35, which are parallel to an optical axis 2 of the camera 1, which is a imaging direction of the camera 1. Alternatively, the sides can be angled to facilitate the directing of the emitted light onto the absorbing layer(s). The lighting elements can also be inserted into the cover element 35.

Alternatively, instead of a camera 1, a lighting module can be used, wherein the optical axis 2 corresponds to a lighting direction of the lighting module.

It is facilitating the assembly of the imaging device of the invention to pre-assemble the cover element with its absorbing layer(s) and the heating element(s) and combine this unit with the camera. This allows for exchanging either the cover or the camera, separately.

In case the lighting elements 5 are IR LEDs it is advantageous to place the same as close as possible to the area to be heated as the light energy rapidly decreases with distance. On possibility could be to integrate the lighting elements in the cover element 35. Enhancing the amount of lighting elements 5 also enhances the amount of light energy which can be converted into heating.

Figure 7:
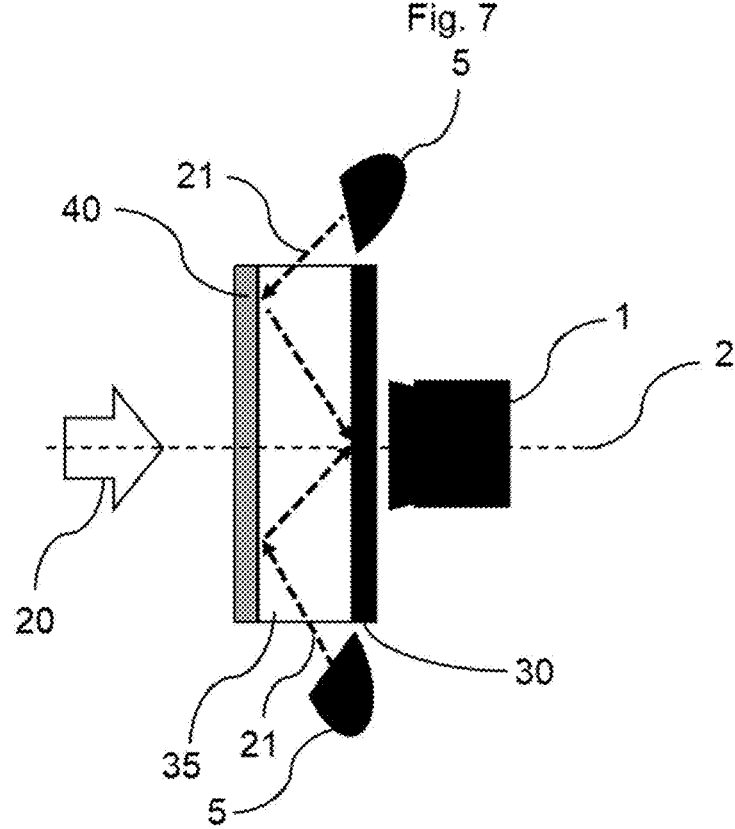
FIG. 7 is a schematic demonstration of a ninth imaging device according to the invention with a cover element with one absorbing layer as heating element, an optional reflecting layer and two lighting elements illuminating the absorbing layer via reflection on the reflecting layer or via total internal reflection on the surface of the inner side of the cover element opposing the absorbing layer.

FIG. 7 shows an ninth embodiment of an imaging device of the invention, which differs from the embodiment of FIG. 6b by using a reflective layer 40 on the outer surface of the cover element 35 and only two lighting elements 5 emitting light onto the reflective layer 40. The reflective layer 40 redirects the light emitted from the lighting elements 5 towards the absorbing layer 30. Preferably, the area of reflection corresponds to the central field of view of the camera 1.

The reflective layer 40 is designed only to reflect wavelengths that are absorbed by the absorbing layer 30, while wavelengths that are desired to be measured by the camera 1 can pass both layers, i.e. the reflective layer 40 as well as the absorbing layer 30 undisturbed.

Alternatively, the light of the lighting elements 5 could enter the element cover 35 at or above the critical angle in order to achieve total internal reflection (TIR) in order to guide the light onto the absorbing layer 30 without the necessity of a reflective layer.

Figure 8:
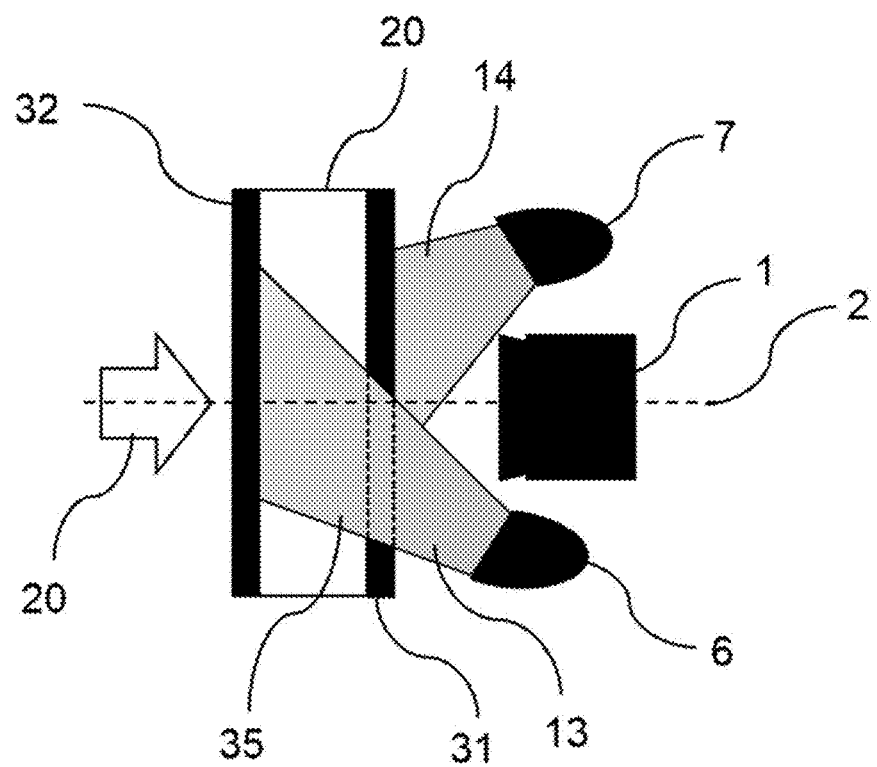
FIG. 8 is a schematic demonstration of a tenth imaging device according to the invention with a cover element with two absorbing layers as heating elements, absorbing light at least partially at different wavelengths, and two lighting elements, emitting light at least partially at different wavelengths and the layer closer to the lighting elements is at least partially transparent for absorbing wavelengths of the more distant absorbing layer.

FIG. 8 shows a tenth embodiment of an imaging device of the invention differing from the embodiment of FIG. 5 by using two lighting elements 6, 7, which emit light either of the same wavelength or at least partially different wavelengths or spectral ranges or of different wavelengths 13, 14.

The first absorbing layer 31 closer to the lighting elements 6, 7 can be transparent or at least partially transparent for the light emitted by the first lighting element 6 such that the light 13 emitted by the first lighting element 6 can pass at least partially through the first absorbing layer 31 hitting the second absorbing layer 32. The second absorbing layer 32 can differ from the first absorbing layer 13. For example, the second absorbing layer 32 can absorb the light 13 emitted by the first lighting element 6. Further, the first absorbing layer 31 can absorb light 14 emitted by the second lighting element 7 and none of the light 13 emitted by the first lighting element 6. This allows to directly illuminating both absorbing layers 31, 32 with light from the different lighting element 6, 7, which can lead to a more uniform heating from both surfaces of the cover element 35 and to combine the advantages of heating from the inside.

The different wavelengths could for example be realized by additional filters, which are attached to the lighting elements 5 or the use of different light emitters, for example LEDs or lasers. The different absorbing layers could be realized using different filter materials, which provide different absorption characteristics. For example the first absorbing layer 31 could be realized as narrow band pass filter (for example filter width of 20 nm), while the second absorbing layer 32 could be realized as broad band or cut off filter, also providing the desired filter effect in order to enable the imaging of images by the camera 1 in only a desired spectral range. Another possibility is the use of partially spectral overlapping filter material for the first and the second absorbing layers 31, 32.

Another advantageous embodiment of the filtering and heating element 16 according to the invention is shown in FIG. 9, where a top view of heating and filtering element 16 with integrated lighting elements 5 is shown. The heating and filtering element 16 of this embodiment comprises a heat absorbing IR cut filters glass.

Furthermore, the lighting elements 5, such as LEDs, are integrated on a printed circuit board (PCB) 8 and are placed preferably on opposite side planes of the heating and filtering element 16, which are substantially parallel to the optical axis of the imaging device. The top surface of the lighting elements 5 projecting the light 10 into the filtering and heating element 16 through the side planes, where a minimum of two LEDs are needed to get a uniform heating of the heating and filtering element 16. Advantageously, the top surfaces of the lighting elements 5 are as close as possible to the side plane of the heating an filtering element 16 or can brought into direct contact to it, in order to provide the highest penetration of light and most efficient heating via absorption.

The filter element 16 thus has a rectangular shape, wherein the two lighting elements 5 are arranged on a first edge 17 and further two lighting elements 5 on a second opposite edge 18. Referring to the side view shown in FIG. 9, the thickness of the heating and filtering element (e.g. said cut off IR absorbing glass) should be equal to or greater than outer boundary of each lighting element 5 (e.g. a LED) used.

Figure 12A:
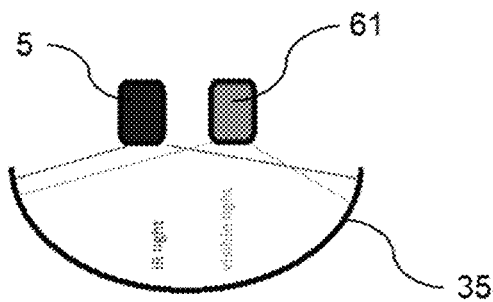
FIG. 12a is a schematic demonstration of a lighting module according to the invention with a lighting device, a lamp means and a cover element.

Hereby, the embodiment of FIG. 9 can be integrated into a imaging device and/or lighting module according to the invention as one part heating filtering and cover element 15 in analogy to FIG. 1b or analogously to the lighting module of FIG. 12a for example. If used as camera/lens cover glass for the imaging device and/or lighting module according to the invention, the heating and filtering element is provided with a hydrophobic coating. The hydrophobic coating is placed on the outer surface of the glass; which eliminates the formation of water droplets in the event of rain or water spilling on the surface, as the water slides down the surface instead of being stagnant on the surface.

Another possibility is to directly connect the heating and filtering element 16 of FIG. 9 to a cover glass in analogy to FIG. 1*a*, however, then with integrated the lighting elements 5.

Figure 10A:
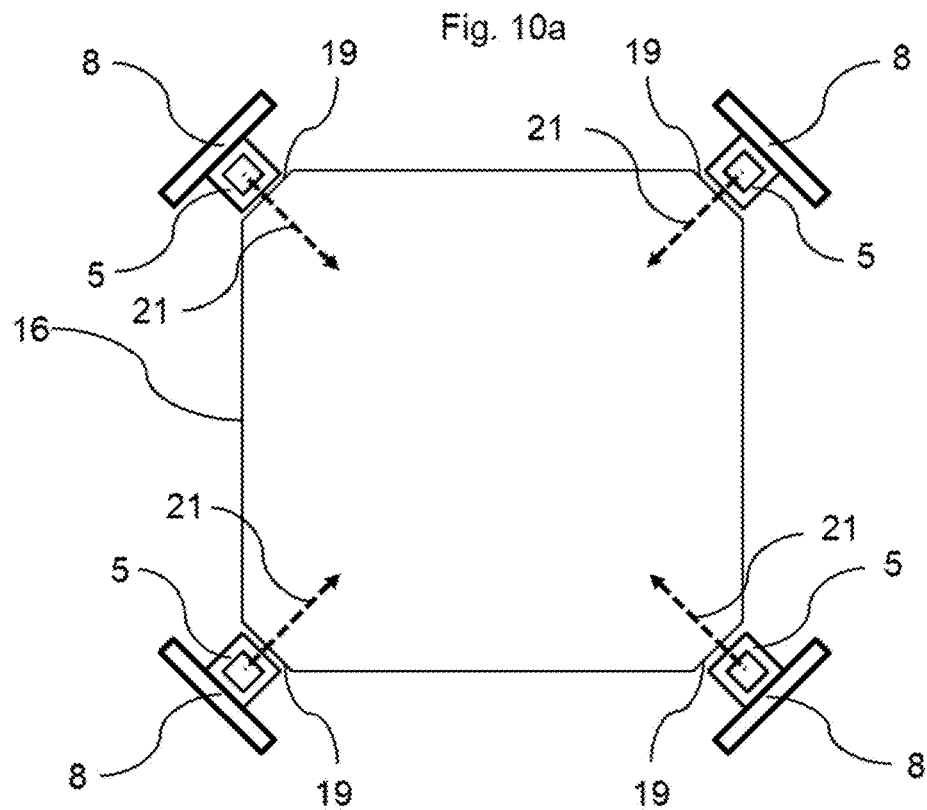
FIG. 10a is a top view of a heating and a filtering element, where the lighting elements are integrated to a printed circuit board and are placed on conically shaped corners of the heating and filtering element.
Figure 10B:
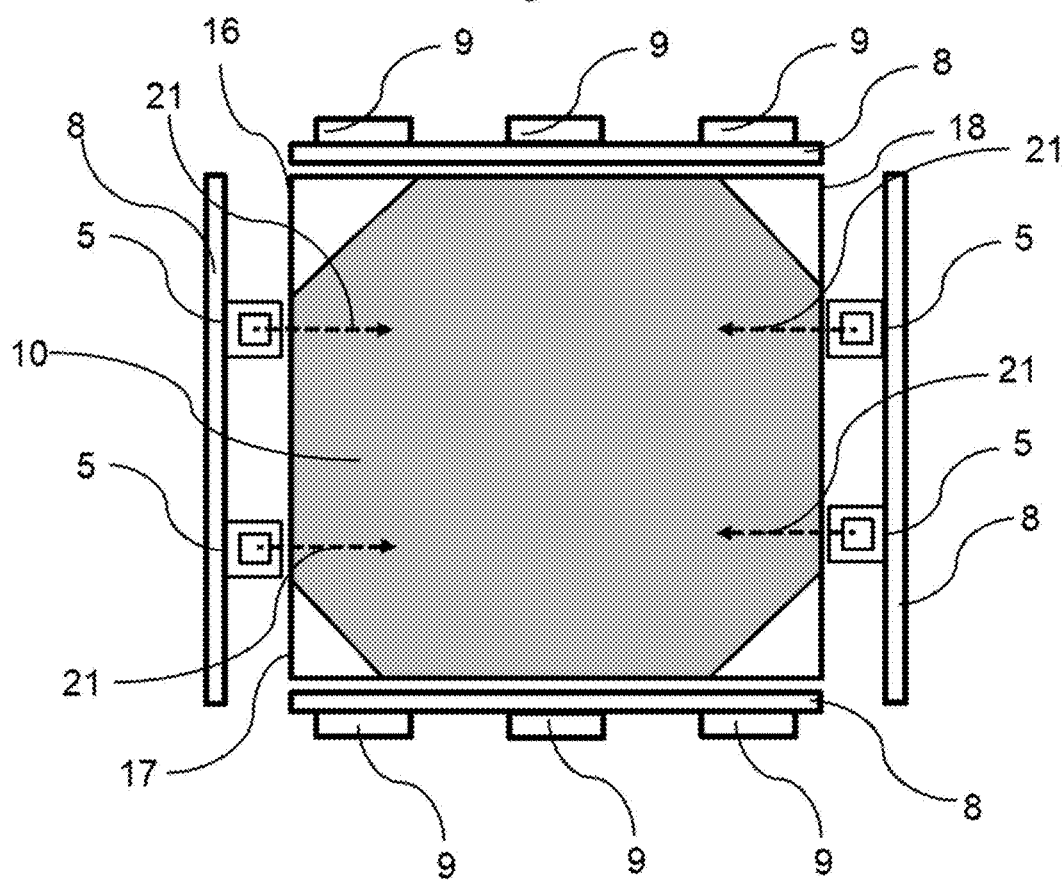
FIG. 10b is a top view of a heating and a filtering element, where the lighting elements are integrated to printed circuit boards and are placed on opposite side planes of the heating and filtering element. Further additional printed circuit boards are placed on the remaining side planes of the heating and filtering element comprising other components.

FIGS. 10*a* and 10*b* show alternatives of the embodiment of FIG. 9.

In FIG. 10*a* the lighting elements 5 integrated on printed circuit boards (PCB) are placed on beveled corners of the heating at filtering element 16, wherein at the beveled corners form new side planes. Preferably, these side planes are angled by 45 degrees. Placing the lighting element on theses beveled corners of the heating and filtering element is most efficient for providing uniform heating all over the heating and filtering element, e.g. a IR cut off filter glass.

FIG. 10*b* shows the embodiment of FIG. 9, were additionally other PCB boards 8 are arranged close or in contact to the heating and filtering element 16. Preferably the additional PCB boards 8 comprise components 9 on the surface facing the heating and filtering element 16, the heat generated by the components adds to the process of heating and subsequent to defogging and defrosting of the heating and filtering element, which serves as well as cover glass or is directly connected to a corresponding cover glass of an image device according to the invention.

Now turning to another aspect of the invention, alternative embodiments according to the invention as lighting module, such as for turn indicators or tail lamps.

FIG. 12*a* shows the concept of heating the cover element 35 of a lighting module in analogy to the imaging device in FIG. 1*a* or 1*b*. In this case light emitted from lighting element 5 comprises wavelengths which are at least partially blocked or absorbed by the lighting modules cover element 35. As discussed beforehand the lighting element could for example emit IR light. By just placing an lighting device, additionally to a lamp means 61 inside the lighting module, allows to project light inside the lighting module. The light of the lighting element 5 reaches the cover element 35 and gets internally reflected multiple times and/or eventually absorbed by the cover element. The absorption process yields an increasing of the temperature of the cover element and hence melting the ice on the outer surface of the cover glass, if present. Additionally, the light of the lamp means 61 is transmitted or at least partly transmitted by the cover element 35, wherein the light emitted by the lamp means is preferably visible to the human eye.

Preferably in such lighting module, the cover element is made up of colorless Plexiglas 150 material (PMMA).

Figure 12B:
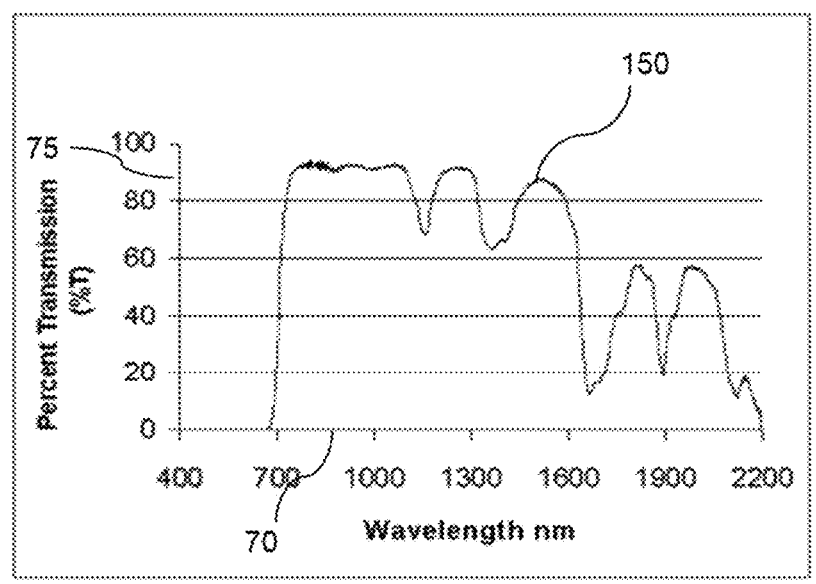
FIG. 12b is a transmission spectrum of Plexiglas in the near IR spectral region used as cover glass for the lighting module.

As shown in FIG. 12*b* Plexiglas 150 transmits most of the invisible near-infrared energy in the 700 to 2,800 nanometer region, but it also absorbs certain bands as shown. The IR transmission of Plexiglas in the near-infrared spectral region depends on thickness, decreasing logarithmically as thickness increases. At infrared wavelengths longer than 2,800 nanometers and as long as 25,000 nanometers (the mid IR spectral region), and in thicknesses greater than 0.118 inch, colorless Plexiglas sheet is entirely opaque. However, the lower the wavelength of the IR light, the higher is the energy of the IR light. Therefore it is advantageously to use lighting devices which emit light with a center wavelength at one or at least close to the absorptions bands given in the diagram of FIG. 12*b*.

Figure 12C:
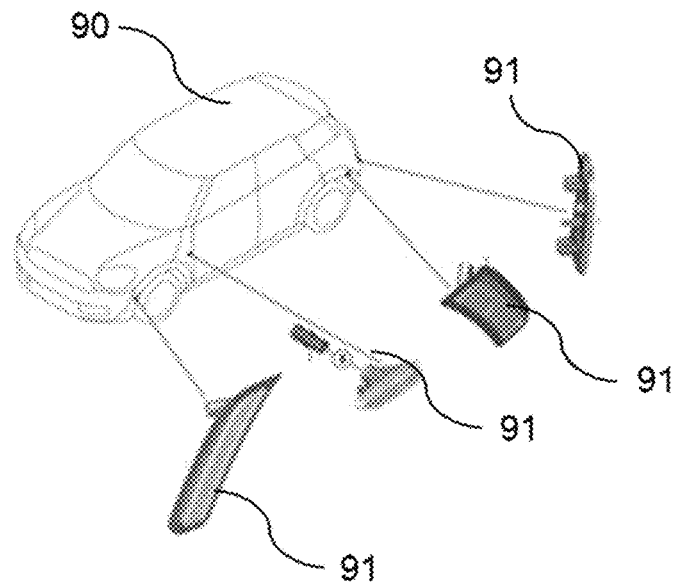
FIG. 12c is vehicle with lighting modules according to the invention.

In FIG. 12*c* different lighting modules of a vehicle 90, preferably a motor vehicle, are shown, where the lighting modules 91 according to the invention is preferably implemented.

Figure 13A:
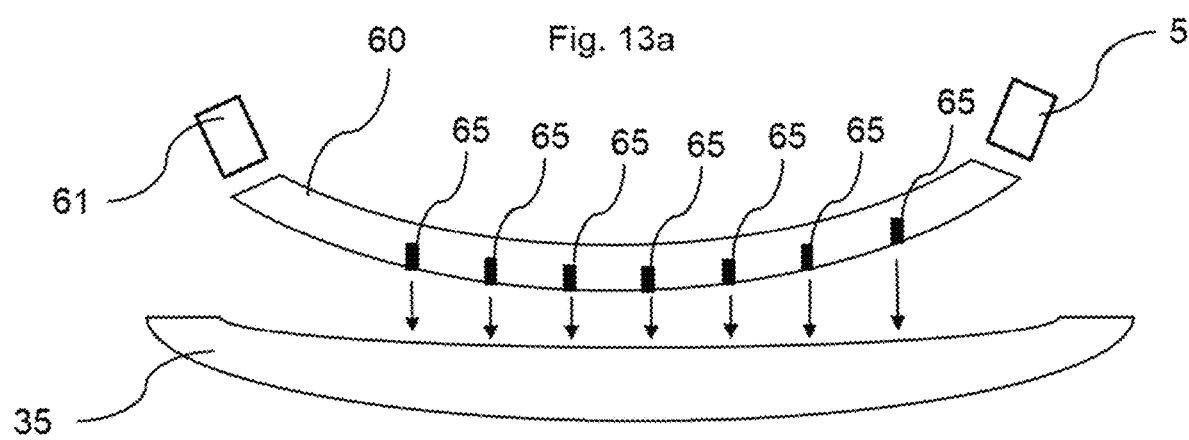
FIG. 13a is a schematic demonstration of a lighting module according to the invention with a lighting device, a lamp means, a light guide and a cover element with the lighting element and the lamp means placed on opposite ends of the light guide.
Figure 13B:
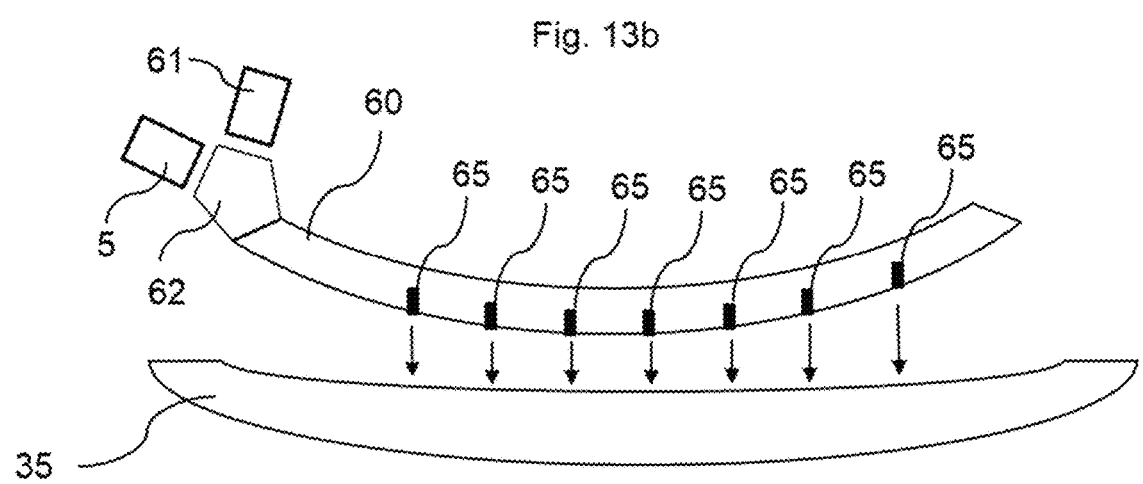
FIG. 13b is a schematic demonstration of a lighting module according to the invention with a lighting device, a lamp means, a light guide and a cover element with the lighting element and the lamp means placed on the same end of the light guide via a dual light coupling-in element.

The FIGS. 13*a* and 13*b* a lighting module according to the invention is shown, where the light of the lighting device is coupled into a light guide 60. Thus the light emitted (e.g. IR light) can be projected/spread inside the lighting module through light guide 60. Through respective light coupling-out points 65, which are placed preferably equidistant along the light guide, the light emitted by the lighting element is directed onto the cover element, where it is absorbed. As shown in FIG. 12*a*, preferably the light guide used for the lighting element, emitting light that is absorbed by the cover element, can also be used for guiding the light of lamp means 61 onto the cover element 35, where it is transmitted to the outside.

In this embodiment, the cover element can also be realized according to the invention by employing other optical elements, or different absorbing layers, as described previously in the other embodiments dealing with a imaging device according to the invention.

While in FIG. 13*a*, the lighting element 5 and the lamp means 61 are coupled in the light guide on opposite ends, in FIG. 13*b* both, the lighting element 5 and the lamp means 61 are coupled in the light guide via a dual light coupling-in element 63 on the same end of the light guide.

Figure 14A:
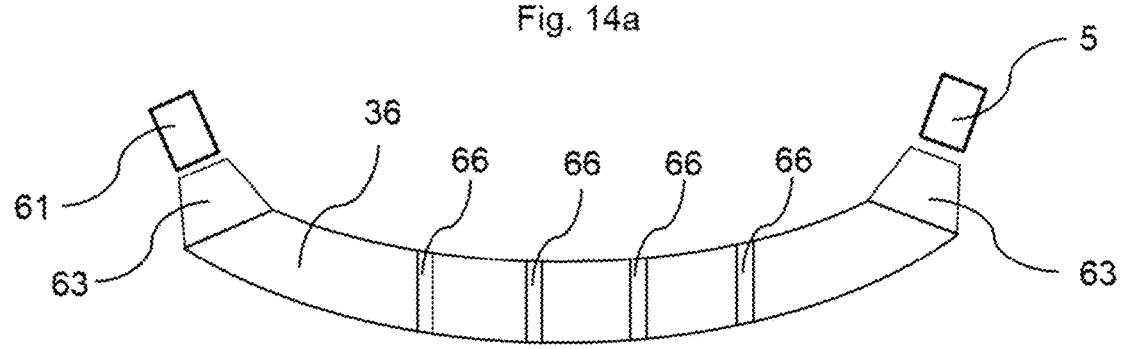
FIG. 14a is a schematic demonstration of a lighting module according to the invention with a lighting device, a lamp means and a one-part cover and light guiding element with the lighting element and the lamp means placed on opposite ends of the one-part cover and light guiding element each via a light coupling-in element.

In FIG. 14*a* the embodiment of FIG. 12*a* is shown, with the difference that the light guide and the cover element are provided as one-part cover and light guiding element 36. This provides an even better and direct heating of the surface of the cover element facing the outside, with the additional effect of a more compact design. Further, the light guiding element features optical elements 66 and/or light coupling out points, which enhance the distribution of light of the lamp means 61 to the outside along the complete one-part cover and light guiding element 36. The light emitted by the lighting element 5 and the lamp means 61 are coupled into the one-part cover and light guiding element 36 via a light coupling-in element 62, which is placed on each end of the one-part cover and light guiding element 36.

Figure 14B:
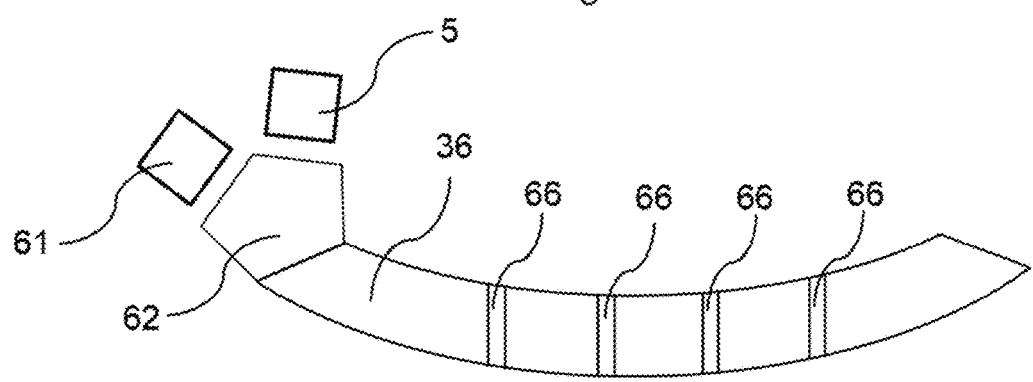
FIG. 14b is a schematic demonstration of a lighting module according to the invention with a lighting device, a lamp means and a one-part cover and light guiding element with the lighting element and the lamp means placed on the same end of the one-part cover and light guiding element via a dual light coupling-in element.

FIG. 14*b* shows the embodiment of FIG. 14*a* with the difference, that the lighting element 5 and the lamp means 61 are arranged as described in the embodiment of FIG. 13*b*, where lighting element 5 and lamp means 61 are coupled in via a dual coupling-in element on only one end.

Figure 14C:
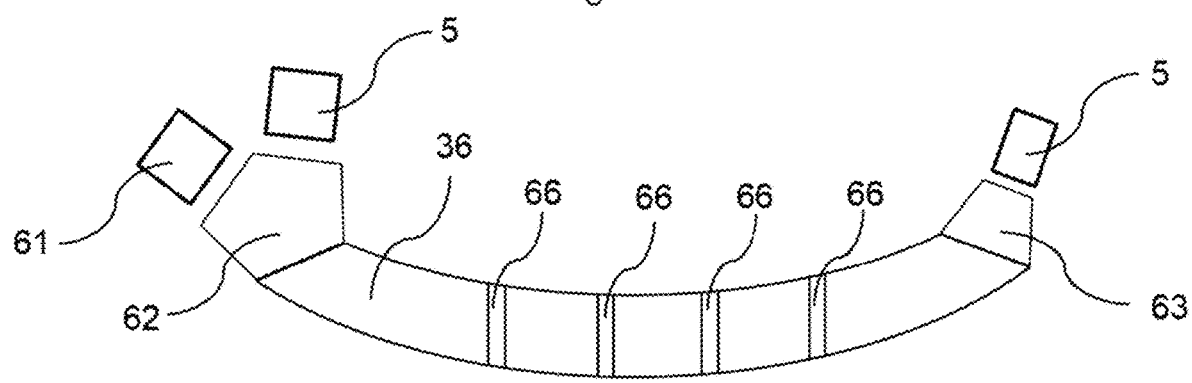
FIG. 14c is a schematic demonstration of a lighting module according to the invention with two lighting device, a lamp means, and a one-part cover and light guiding element with one lighting element and the lamp means placed on the same end of the one-part cover and light guiding element via a light dual coupling-in element and the other lighting element is placed on the opposite end of the one-part cover and light guiding element via a light coupling-in element.

FIG. 14*c* shows the embodiment of FIG. 14*b* with an additional lighting element on the opposite end of the one-part cover and light guiding element 36. This configuration allows a superior heating of the one-part cover and light guiding element 36.

Further in all embodiments described above, the lighting elements 5, such as IR emitting LEDs, can be on the same PCB which comprises the lamp means 61, e.g. visible light emitting LEDs, or can be on a separate PCB.

Moreover, all embodiments described above can include an automated ice clearing or defogging by detecting the ambient temperature and turning on the lighting element(s) (e.g IR source/sources) by a control unit 3. The control unit 3 receives ambient temperature data from ambient temperature measuring module and the data communication can be through I2C, SPI, CAN, LIN or by voltage/current signals. The control unit 3 controls the on/off of the lighting element (s) through initiating/stopping power supply of the lighting element(s).

Further, the embodiments according to the invention described above can be combined with any other heating means for cover elements known to the person skilled in the art, such as ITO coatings or electrical wires or the like, to provide an advantageous heating of the cover element. For example, an advantageous heating of a cover element from inside and outside as stated above can be provided by using filter and/or heating elements according to the invention to heat from the inside and conventional heating techniques to heat from the outside.

The embodiments shown here are only examples of the present invention and must therefore not be understood as restrictive. Alternative embodiments considered by the skilled person are equally covered by the scope of protection of the present invention.

LIST OF REFERENCE NUMERALS 1 camera
2 optical axis
3 control unit
5 lighting element
6 first lighting element
7 second lighting element
8 printed circuit board (PCB)
9 components of a printed circuit board (PCB)
10 light emitted form lighting element
11 overlapping area
12 focused light
13 light of a first wavelength or wavelength range
14 light of a second wavelength or wavelength range
15 one-part heating filtering and cover element
16 heating and filter element
17 first edge
18 second opposite edge
19 beveled corner
20 radiation from outside
21 lighting direction
25 focusing optics
30 absorbing layer
31 first absorbing layer
32 second absorbing layer
35 cover element
36 one-part cover and light guiding element
40 reflecting layer
45 lighting element providing narrow band light emission
50 band pass filter
55 light emitted form lighting element providing narrow band light emission
60 light guide
61 lamp means
62 light coupling-in element
63 dual light coupling-in element
65 light coupling-out points in the light guide
66 optical elements of the one-part cover and light guiding element
70 wavelength in nm
75 transmission in %
80 preferred spectral range for heating/absorbing layer
90 vehicle
91 lamp elements on a vehicle according to the invention
100 First absorbing and cut off filter
110 Second absorbing and cut off filter
120 Third absorbing and cut off filter
130 Fourth absorbing and cut off filter
140 Fifth absorbing and cut off filter
150 transmission spectrum of Plexiglas

The invention claimed is:
1. An imaging device or lighting module, comprising:
a camera or lamp;
a cover element;
a filter element that is connected to the cover element or is part of the cover element, wherein the filter element has a rectangular shape with beveled corners; and
at least one lighting element that emits light in an infrared spectral range, wherein the at least one lighting element is arranged laterally at one of the beveled corners of the filter element,
wherein energy of the emitted light is at least partially absorbed by the filter element and is converted into heat for heating the filter element and the cover element, and
wherein the at least one lighting element is arranged at a distance from the filter element of at most 10 mm, or the at least one lighting element is in direct contact with the filter element to convert the energy of the emitted light into heat.

2. The imaging device or lighting module according to claim 1, wherein the at least one lighting element is arranged laterally in relation to the filter element, so that a lighting direction of the infrared lighting element relative to an optical axis of the imaging device or the lighting module, which is an imaging direction of the imaging device or a lighting direction of the lighting module has an angle between 40° and 130°.

3. The imaging device or lighting module according to claim 1, wherein the at least one lighting element includes a lighting element arranged laterally at each of four beveled corners.

4. The imaging device or lighting module of claim 1, wherein the filtering element comprises one or more of:
a heating and filtering element,
one or more absorbing layers on the cover element, or
a one-part heating, filtering and cover element formed together with the cover element.

5. The imaging device or lighting module of claim 4, wherein
the cover element or filtering element is manufactured from glass, and/or
the one-part heating, filtering and cover element is provided by tinted glass.

6. The imaging device or lighting module of claim 4, wherein the cover element or the one-part heating, filtering and cover element is separate from a lens or mirror of the camera or lamp.

7. The imaging device or lighting module of claim 1, wherein a cut-off wavelength range of the filtering element
is matched to a cut-off wavelength range required by the camera,
lies within a wavelength range of sun light,
lies within a wavelength range of at least one lighting element comprised by the imaging device or lighting module and emitting light onto the filtering element, or
is at least partially transparent to the light emitted by the lamp, wherein the lamp emits light in a visible range.

8. The imaging device or lighting module of claim 1, wherein
the filtering element is arranged either (i) substantially perpendicular to an optical axis of the camera or the lamp, (ii) within a central field of view of the camera, or (iii) within a beam cone of the lamp,
a first absorbing layer is provided on a side of the cover element facing towards the camera, or
a second absorbing layer is provided on a side of the cover element facing away from the camera or lamp.

9. The imaging device or lighting module of claim 1, wherein
a first self-cleaning coating is provided on a side of the cover element facing towards the camera or lamp, or a second self-cleaning coating is provided on a side of the cover element facing away from the camera or lamp, wherein each self-cleaning layer comprises a waxing layer or hydrophobic or a super hydrophobic coating.

10. The imaging device or lighting module of claim 1, wherein the at least one light element includes two or more lighting elements, wherein one or more first lighting elements emit light with wavelengths in a first range to be cut-off by a first absorbing layer, one or more second lighting elements emit light with wavelengths in a second range to be cut-off by a second absorbing layer or to at least partially pass the first absorbing layer.

11. The imaging device or lighting module of claim 1, further comprising one or more of:
at least one reflecting element comprising a reflecting layer,
at least one optical element comprising focusing optics,
at least one light guide with light coupling-out points that are equidistantly distributed, and
at least one mounting element for the at least one lighting element for adjusting a relative arrangement between the at least one lighting element and the heating element,
adapted to direct light emitted by the at least one lighting element to at least one area of the cover element to be heated, which is aligned with an optical axis or a central field of view of the camera or a beam cone of the lamp.

12. The imaging device or lighting module of claim 11, wherein the light guide provides light at least one light coupling-in element on at least one end of the light guide and/or another end of the light guide and/or on opposite ends of the light guide, for at least coupling-in light emitted by the at least one lighting elements or the lamp means.

13. The imaging device or lighting module of claim 1, wherein the light guide is provided as a one-part cover and light guiding element, comprising light coupling-out points and/or optical elements.

14. The imaging device or lighting module of claim 13, wherein the light of the lamp and the at least one lighting element are coupled in the light guide, by a dual light coupling-in element, on a same end and/or on an opposite end and/or on all ends of the light guide, wherein a plurality of lighting elements or lamps are used.

15. The imaging device or lighting module of claim 1, wherein there are at least two lighting elements emitting light overlapping on the cover element or in an overlapping area, which is matched to the at least one area of the cover element to be heated, which is aligned with an optical axis or a central field of view of the camera or a beam cone of the lamp.

16. The imaging device or lighting module of claim 1, wherein the at least one lighting element directly or indirectly illuminate the filter element by passing a region of the cover element or being reflected by a reflecting element or via total internal reflection.

17. The imaging device or lighting module of claim 1, further comprising at least one of
a housing, which is closed by a cover glass or a one-part heating, filtering and cover element,
ventilation comprising a gap between the cover glass or the one-part heating, filtering and cover element and the housing, or
a sealed interior, which has a negative pressure, in particular a vacuum, or is filled with dry air or protective gas, with said sealed interior comprising an ambient space between the camera, the at least one lighting elements, and the cover glass or the one-part heating, filtering and cover element.

18. The imaging device or lighting module of claim 1, wherein
one or more lighting elements, integrated on at least one printed circuit board, are used, wherein the one or more lighting elements are arranged on side planes of the filtering element, which are substantially parallel to an optical axis of the imaging device or lighting module, and
top surfaces of the one or more lighting elements project light into the filtering element, wherein if more than one lighting element is used, the one or more lighting elements are arranged on opposite side planes.

19. The imaging device or lighting module of claim 1, wherein
a thickness or a width of side planes or edges of the filtering element is equal to or greater than an outer boundary of each of the at least one lighting element, or
printed circuit boards are arranged next to and/or in thermal contact with the filtering element, wherein the printed circuit boards comprise components on a surface facing the filtering element which generate heat that complements to the heating of the filtering element.

20. The imaging device or lighting module of claim 1, further comprising
a control unit or an interface to an external control unit connected to at least one of the at least one lighting element, the camera or lamp, mounting elements, and at least one sensor element, and controlling the at least one lighting element based on
whether the camera or lamp is switched on,
a signal received from the at least one sensor element or via the interface,
a signal received from the camera or lamp means, or
a user input,
wherein data communication with the control unit is provided by I2C, SPI, CAN, LIN or by voltage/current signals.

21. The imaging device or lighting module of claim 20, wherein
controlling the at least one lighting element comprises switching on, switching off, changing the amplitude, frequency, pulsing, pulsing sequence and/or propagation direction of the light emitted by the at least one lighting element, or
controlling the at least one lighting element comprises an adjustment of an illumination pattern on the filter element via the mounting elements.

22. A rear view device for a vehicle with at least one imaging device or lighting module according to claim 1.

23. A driving assistance system for a vehicle with at least one imaging device or lighting module according to claim 1.

24. A vehicle with at least one imaging device or lighting module according to claim 1, wherein a control unit is connected to a vehicle control unit or an external control unit is comprised by the vehicle control unit.

* * * * *